United States Patent
Tabata et al.

(10) Patent No.: US 6,587,042 B2
(45) Date of Patent: Jul. 1, 2003

(54) AUTOMATIC ACCIDENT INFORMING APPARATUS FOR TWO-WHEEL VEHICLE

(75) Inventors: Hajime Tabata, Saitama (JP); Kazumitsu Kushida, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/926,227

(22) PCT Filed: May 10, 2001

(86) PCT No.: PCT/JP01/03885

§ 371 (c)(1),
(2), (4) Date: Sep. 26, 2001

(87) PCT Pub. No.: WO01/87695

PCT Pub. Date: Nov. 22, 2001

(65) Prior Publication Data

US 2002/0158754 A1 Oct. 31, 2002

(30) Foreign Application Priority Data

May 19, 2000 (JP) .......................................... 2000-148857

(51) Int. Cl.⁷ ................................................. B62J 3/00
(52) U.S. Cl. ...................... 340/432; 340/440; 280/755; 116/28 R; 180/282
(58) Field of Search ................................. 340/432, 429, 340/427, 440, 438; 280/755; 116/28 R; 180/280, 282

(56) References Cited

U.S. PATENT DOCUMENTS

| | | | |
|---|---|---|---|
| 3,772,643 A | 11/1973 | Dodd et al. ................ 340/52 H |
| 6,034,594 A | * 3/2000 | Gray ........................ 340/440 |
| 6,268,794 B1 | * 7/2001 | Tzanev ....................... 340/575 |
| 6,285,279 B1 | * 9/2001 | Yamazaki .................... 340/432 |
| 6,360,838 B1 | * 3/2002 | Kulhavy ...................... 180/219 |

FOREIGN PATENT DOCUMENTS

| | | |
|---|---|---|
| JP | 58-16399 | 1/1983 |
| JP | 64-28086 | 1/1989 |
| JP | 64-31294 | 2/1989 |
| JP | 5-5626 | 1/1993 |
| JP | 6-20190 | 1/1994 |
| JP | 6-247233 | 9/1994 |
| JP | 10-104258 | 4/1998 |
| JP | 2000-118336 | 4/2000 |

\* cited by examiner

*Primary Examiner*—Anh V La
(74) *Attorney, Agent, or Firm*—Armstrong, Westerman & Hattori, LLP.

(57) ABSTRACT

An automatic accident informing apparatus for a two-wheel vehicle is provided which can detect the occurrence of accident with the use of a simple arrangement. The automatic accident informing apparatus for a two-wheel vehicle includes an accident detecting module 3 for detecting an accident of the vehicle and an accident informing module 7 arranged responsive to the occurrence of the accident detected by the accident detecting module 3 for informing an external party(s) of the accident. The accident detecting module 3 includes an inclination sensor 2 for measuring the inclination angle of the vehicle and an accident judgment unit 340 for judging that the vehicle met with the accident when the inclination of the vehicle remains higher than a predetermined degree throughout a specific length of time.

3 Claims, 5 Drawing Sheets

AUTOMATIC ACCIDENT INFORMING APPARATUS FOR TWO-WHEEL VEHICLE

TECHNICAL FIELD

The present invention relates to a automatic accident informing apparatus for a two-wheel vehicle and particularly to an accident informing apparatus for detecting the accident of a two-wheel vehicle with the use of a simple arrangement but not an acceleration sensor and automatically informing of the accident.

BACKGROUND ART

Disclosed in Japanese Patent Laid-open Publications (Showa) 58-16399 and (Heisei) 5-5626 are automatic accident informing apparatuses for, when a vehicle have an accident, automatically informing of the accident to quickly receive a first aid.

According to the prior arts, the accident is detected by an acceleration sensor mounted a vehicle when a significant degree of acceleration is sensed and an emergency signal is transmitted together with data of the position of the vehicle by a radio communicating means to a predetermined station. As the acceleration sensors provided for an air-bag safety system are used as accident sensors for detecting the accident, the number of components and the overall weight will be decreased, thus minimizing the cost of the apparatus.

The prior arts are however developed for four-wheel vehicles and can hardly be applied to two-wheel vehicles. Because the existing two-wheel vehicles are commonly provided with no air-bag safety system, the acceleration sensors have to be mounted separately. Additionally, the accident of the two-wheel vehicles includes not only a crash but also a fall down. The level of acceleration at the fall down may be smaller than that at the crash. It is hence difficult to determine whether the accident is a crash or a fall down with the use of a single acceleration sensor. As a result, either different sensing range types or an advanced, expensive, wider sensing range type of the acceleration sensor have to be used.

When a high level of sensing signal is output from the acceleration sensor, it have to be examined whether it is due to the serious accident or a minor incident such as running over a step-stone and requires a post signal process such as sophisticated waveform analysis.

It is an object of the present invention to provide an automatic accident informing apparatus for a two-wheel vehicle which can detect the occurrence of an accident with the use of a simple arrangement but not any acceleration sensor.

DISCLOSURE OF INVENTION

For achievement of the object, an automatic accident informing apparatus for a two-wheel vehicle which includes an accident detecting means for detecting an accident of the vehicle and an accident informing means for informing an external party(s) of the accident is adapted having the following features according to the present invention.

(1) The accident detecting means comprises: an inclination sensor for measuring the inclination angle of the vehicle; and an accident judging means for judging that the vehicle met with the accident when the inclination angle of the vehicle measured by the inclination sensor remains higher than a predetermine degree throughout a specific length of time.

As the accident such as a crash or fall down of a two-wheel vehicle is detected from a signal output of the inclination sensor, the overall arrangement can be more simplified than that using an acceleration sensor. Also, most two-wheel vehicles are equipped with the inclination sensor and will thus require no particular sensors for the accident judgment.

It is judged that the vehicle met with an accident when the inclination angle of the vehicle remains higher than the predetermine degree throughout the specific length of time. If the vehicle is fell down in its non-running mode and stood back quickly by the driver, it is not judged that the vehicle met with the accident. As a result, an unnecessary information will be avoided.

(2) Another apparatus comprises: a vehicle speed history saving means for saving the history of speeds of the vehicle; an acceleration calculating means for calculating the acceleration of the vehicle from a vehicle speed saved in the vehicle speed history saving means; and a line break detecting means for detecting the break in particular circuitry line, wherein the accident detecting means judges that the vehicle met with the accident when the line break detecting means detects a break in the circuitry line about a time while the acceleration of the vehicle is greater than a predetermined level.

When the break in the particular circuitry lines is detected, it is judged that the vehicle met with an accident. Accordingly, the action of informing of the accident can be carried out automatically even if the signal line of a sensor for detecting the accident is injured by the accident.

BEST MODE FOR EMBODYING THE INVENTION

Figure 1:
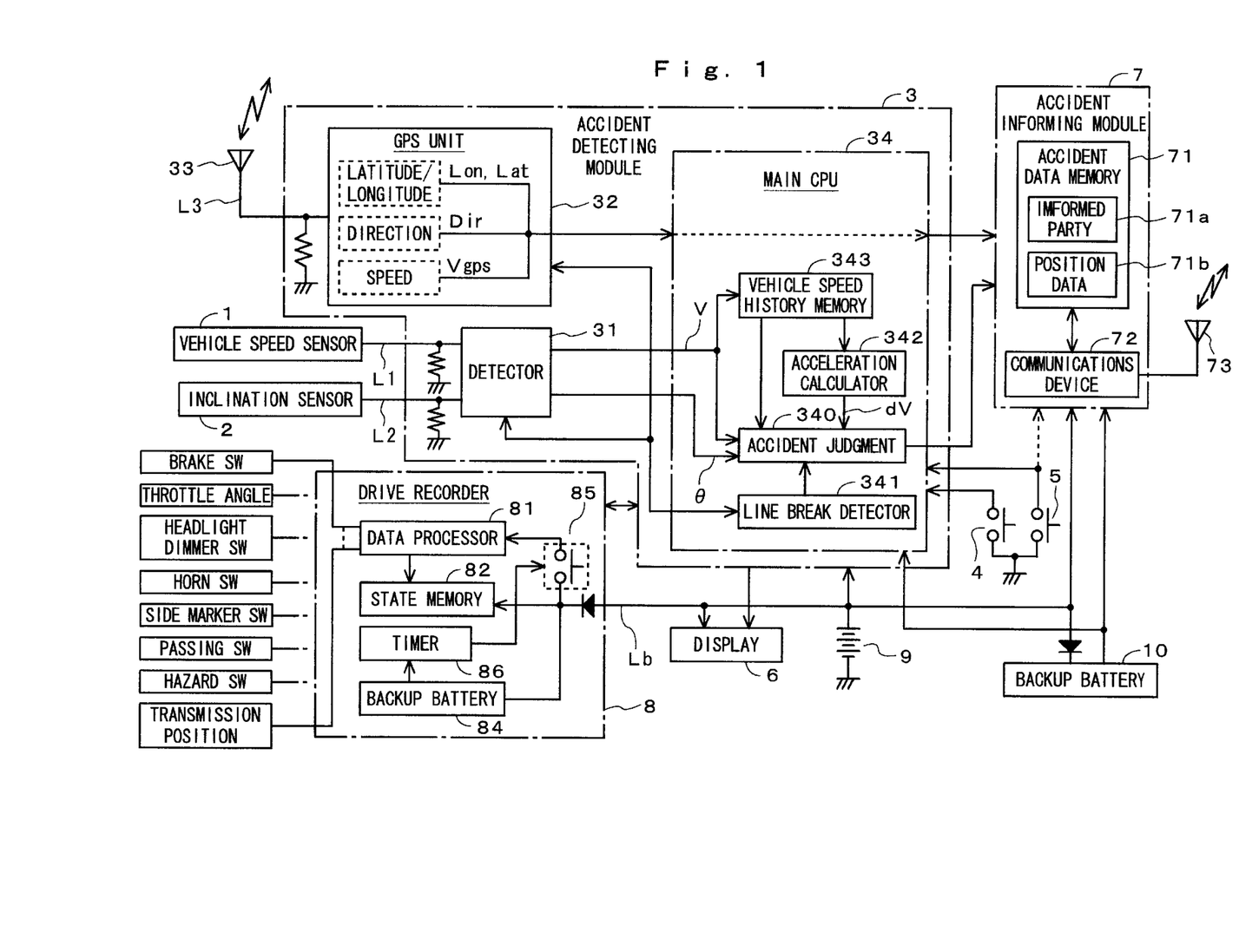
FIG. 1 is a block diagram showing one embodiment of the present invention.

FIG. 1 is a block diagram of an automatic accident informing apparatus for a two-wheel vehicle according to one embodiment of the present invention, which comprises a vehicle speed sensor 1 for generating a signal indicative of the speed of a vehicle, an inclination sensor 2 for generating a signal indicative of the angle of inclination of the vehicle, an accident detecting module 3 for detecting an accident of the vehicle, an accident informing module 7 responsive to the detection of the accident in the accident detecting module 3 for informing an external party of the accident, and a drive recorder 8 for recording driving data before and after the accident.

The accident detecting module 3 includes a detector 31 for detecting the inclination angle θ and the speed V of the vehicle from the output signals of the vehicle speed sensor 1 and the inclination sensor 2, a GPS unit 32, an antenna unit 33 connected to the GPS unit 32, and a main CPU 34.

The GPS unit 32 measures the latitude Lat, the longitude Lon, the direction Dir, and the speed Vgps of the vehicle. The main CPU 34 includes a vehicle speed history memory 343 for saving a history of the vehicle speed V measured by the vehicle speed sensor 1, an acceleration calculator 342 for calculating the acceleration dV of the vehicle from data saved in the vehicle speed history memory 343, a line break detector 341 for examining whether or not the signal line L1 from the vehicle speed sensor 1, the signal line L2 from the inclination sensor 2, and the signal line L3 from the GPS antenna 33 are broken, and an accident judgment 340 for judging from the speed V, the inclination angle θ, the acceleration dV of the vehicle, and a signal output of the line break detector 341 whether the vehicle has an accident or not.

The signal lines L1 and L2 of the detector 31 side and the signal line L3 of the GPS unit 32 side are pulled down (or up) with high resistances. The line break detector 341 constantly monitors the voltage level on the signal lines L1, L2, and L3 and when the voltage level is turned to "L" (or "H") level, detects break in line.

The main CPU 34 is also connected with an emergency switch 4, a rest switch 5, and a display 6. The emergency switch 4 is switched on by a driver informing of an accident regardless of the actual event. The reset switch 5 is also switched on when no information is needed. Upon receiving a reset signal from the reset switch 5, the main CPU 34 (and/or the accident informing module 7) cancels the action of information.

The accident informing module 7 includes an accident data memory 71 and a communications device 72. The accident data memory 71 has an informed party area 71a for saving at least one party to be informed and a position data area 71b for saving the position of the vehicle at the time of the accident received from the GPS unit 32. The communications device 72 upon receiving a command of informing the accident from the CPU 34 transmits by radio the position data together with a message of the accident to all the parties saved in the informed party area 71a.

The main CPU 34 and the accident informing module 7 are also energized with a backup battery 10 for continuing the transmission of the accident message when a main battery 9 or breaks the power line Lb is broken by the accident. The antenna 73 for the communications device 72 may be built in the accident informing module 7 or installed together with the accident informing module 7 in a single enclosure. As its signal line is not exposed to the outside, the antenna 73 will hardly lose its function by the accident.

The accident detecting module 3 and the accident informing module 7 maybe connected to a radio communications network by the Bluetooth standard which has been developed for near-distant data communications. When the driver has a hand-held telephone equipped with the Bluetooth standard, the accident detecting module 3 mounted in the vehicle needs not to be connected by a cable to the hand-held telephone or the accident informing module 7. With the Bluetooth standard, an advantageous system can be employed where a hard hat(helmet) of the driver is equipped with a radio communications apparatus for transmitting and receiving radio signals with the accident informing module 7.

The drive recorder 8 is connected with a brake switch, a throttle angle sensor, a headlight dimmer switch, a horn switch, a side marker switch, a passing switch, a hazard switch, and a transmission position sensor and its data processor 81 detects and saves the action of each switch or sensor in a state memory 82. A backup battery 84 energized constantly by the battery 9 is also provided for when the accident breaks the battery line Lb, feeding both the data processor 81 and the state memory 82 with power.

The backup battery 84 is connected by a switch 85 to the data processor 81. A timer 86 is provided for starting the counting action when the battery line Lb is broken and the action of backup energization is commenced. When a predetermined duration of time has passed, the switch 85 is opened. As a result, the feeding of power is canceled to the data processor 81 but not to the state memory 82. This allows the state memory 82 to be energized by the backup battery 84 for an extended period of time.

Figure 2:
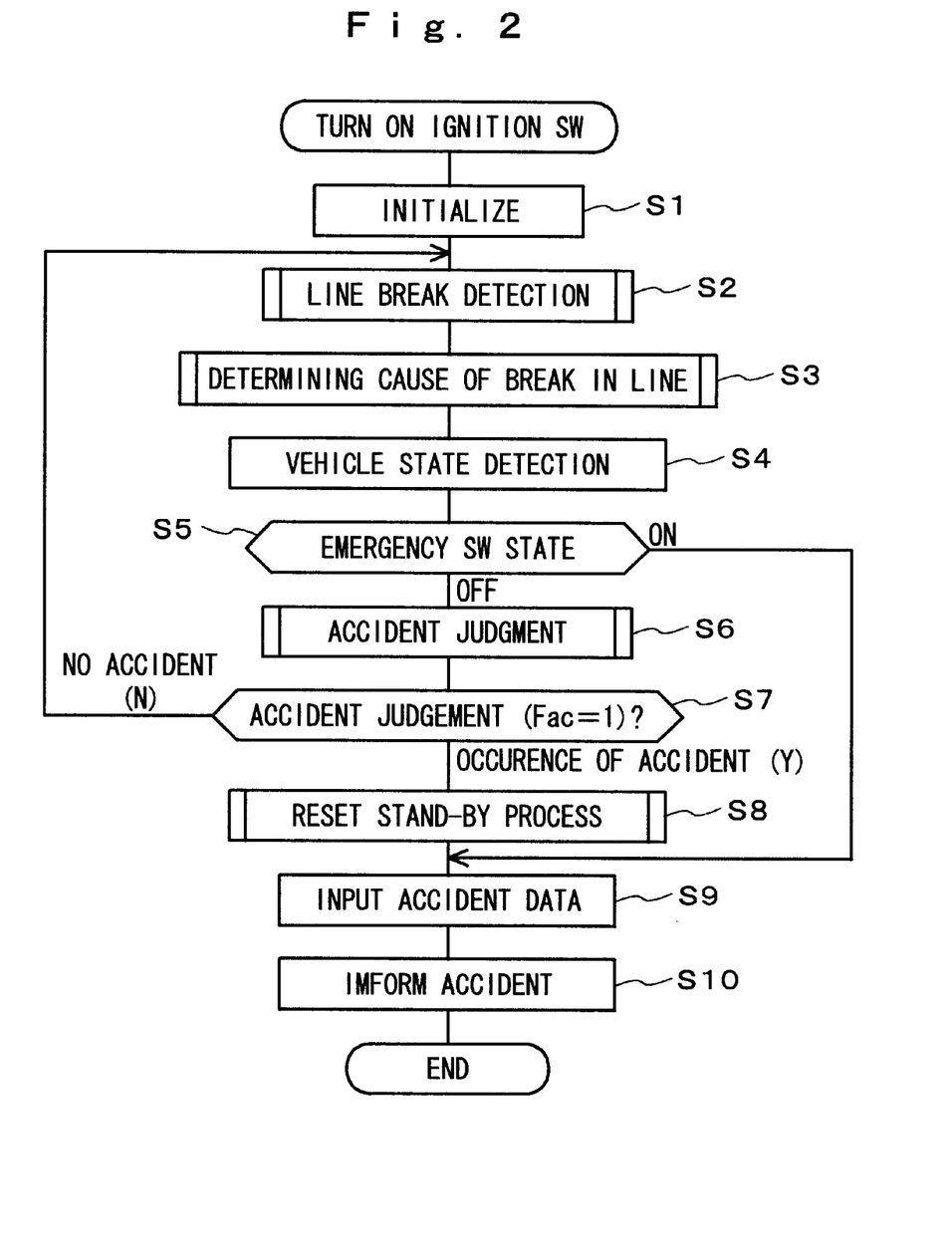
FIG. 2 is a flowchart showing an action of the embodiment shown in FIG. 1.

The action of the embodiment will now be described referring to a flowchart shown in FIG. 2. Referring to FIG. 2, the procedure starts with Step S1 for initializing the parameters when the ignition switch (not shown) is turned on, for example, resetting of a break flag Fcut and an accident break flag FCV. It is then examined whether or not the signal lines L1 and L2 from the vehicle speed sensor 1 and the inclination sensor 2 respectively and the signal line L3 from the GPS antenna 33 as well as the sensors 1, 2 and the GPS antenna 33 themselves are enable.

When it is judged that the sensors 1 and 2 and the GPS antenna 33 operate normally, the procedure goes to Step S2 of line break detection where it is examined whether the signal lines L1, L2, and L3 from the two sensors 1 and 2 and the GPS antenna 33 are broken or not.

Figure 3:
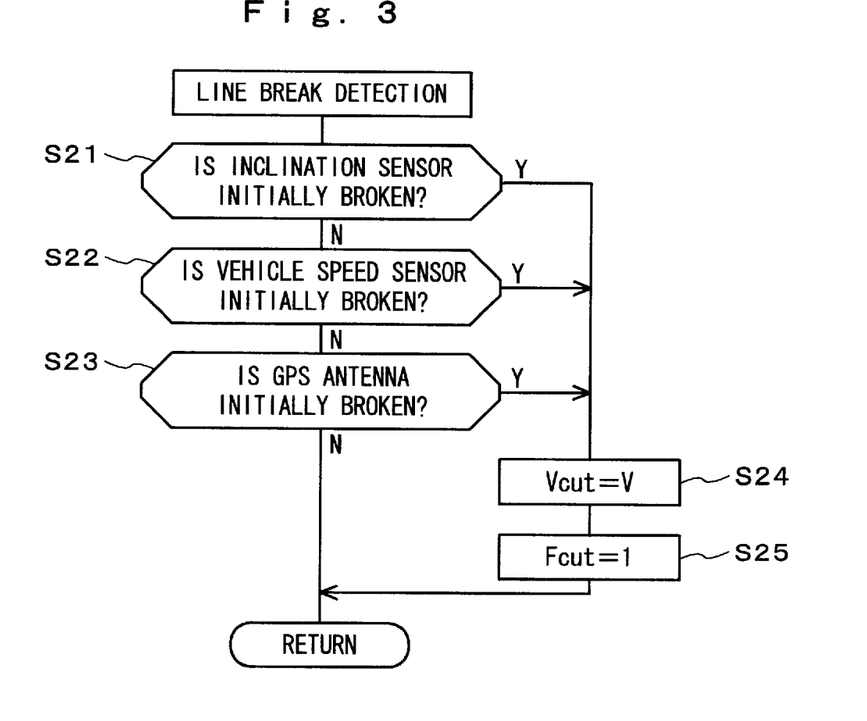
FIG. 3 is a flowchart showing a procedure of detecting line break.

FIG. 3 is a flowchart showing a procedure of the line break detection which is mainly the action of the line break detector 341.

It is examined at Step S21 where or not the signal line L2 from the inclination sensor 2 is broken. When the break in line is initially detected, the procedure goes to Step S24. When not or the break in line has been detected, the procedure advances to Step S22. It is then examined at Step S22 whether or not the signal line L1 from the vehicle speed sensor 1 is broken. Similarly, it is examined at Step S23 whether or not the signal line L3 from the GPS antenna 33 is broken. In either case, when the disconnection on the signal line is initially detected, the maximum speed of the vehicle speed V for past five seconds for example is set at Step S24 to the disconnection Vcut. Then, the line break flag Fcut is set up.

Returning back to FIG. 2, when the break in line is newly found on the signal lines L1, L2, or L3 in the line break detection at Step S2, a process of determining the cause of the break follows where it is examined whether or not the break in line is caused by the accident.

Figure 4:
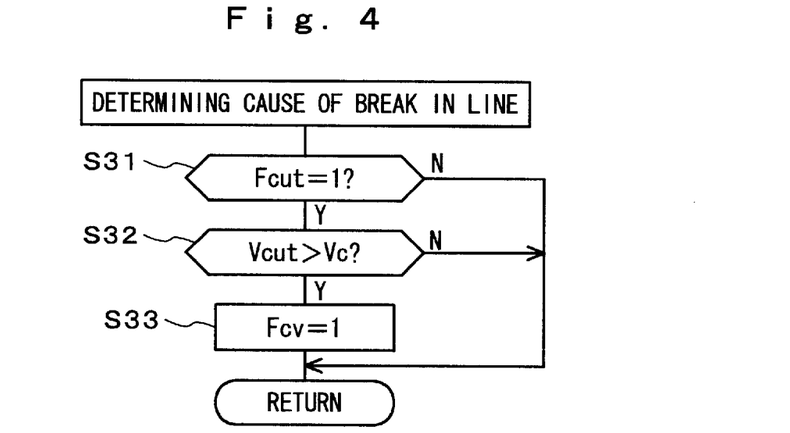
FIG. 4 is a flowchart showing a procedure of examining the cause of the line break.

FIG. 4 is a flowchart showing the procedure of determining the cause of the break in line which is mainly the action of the accident judgment 340.

The line break flag Fcut is first examined at Step S31. When the line break flag Fcut is set up, the procedure goes to Step S32 for comparing between the speed at the break in line Vcut and a reference speed Vc. When the speed Vcut is not higher than the speed Vc which may be set to 1 km/h, it is judged that the line break is caused by not a traffic accident but a mistake during the maintenance service regardless of the accident for example and the procedure is terminated.

When the speed Vcut is higher than the speed Vc, it is judged that the break in line is caused by the traffic accident during the running and procedure advances to Step S33. At Step S33, the accident break flag Fcv indicating that the signal lines are broken by the accident is set up.

Returning to FIG. 2, the procedure goes to Step S4 where the vehicle speed V measured by the vehicle speed sensor 1, the acceleration dV calculated by the acceleration calculator 342, the inclination angle θ measured by the inclination sensor 2, and the longitude Lon, the latitude Lat, the speed Vgps, and the direction Dir measured by the GPS unit 32 are saved as the position data in the position data area 71b in the accident data memory 71 in the accident informing module 7. The position data area 71b holds the position data of the past 10 seconds sampled at equal intervals of a predetermined sampling period. The position data before 10 seconds are erased as the time goes by.

This is followed by Step S5 where it is examined whether the emergency switch 4 is closed or not. When so, the procedure jumps to Step S9 for informing of the occurrence of an accident, which will be described later in more detail. When not, the procedure goes to Step S6 where the action of accident judgment is carried out.

Figure 5:
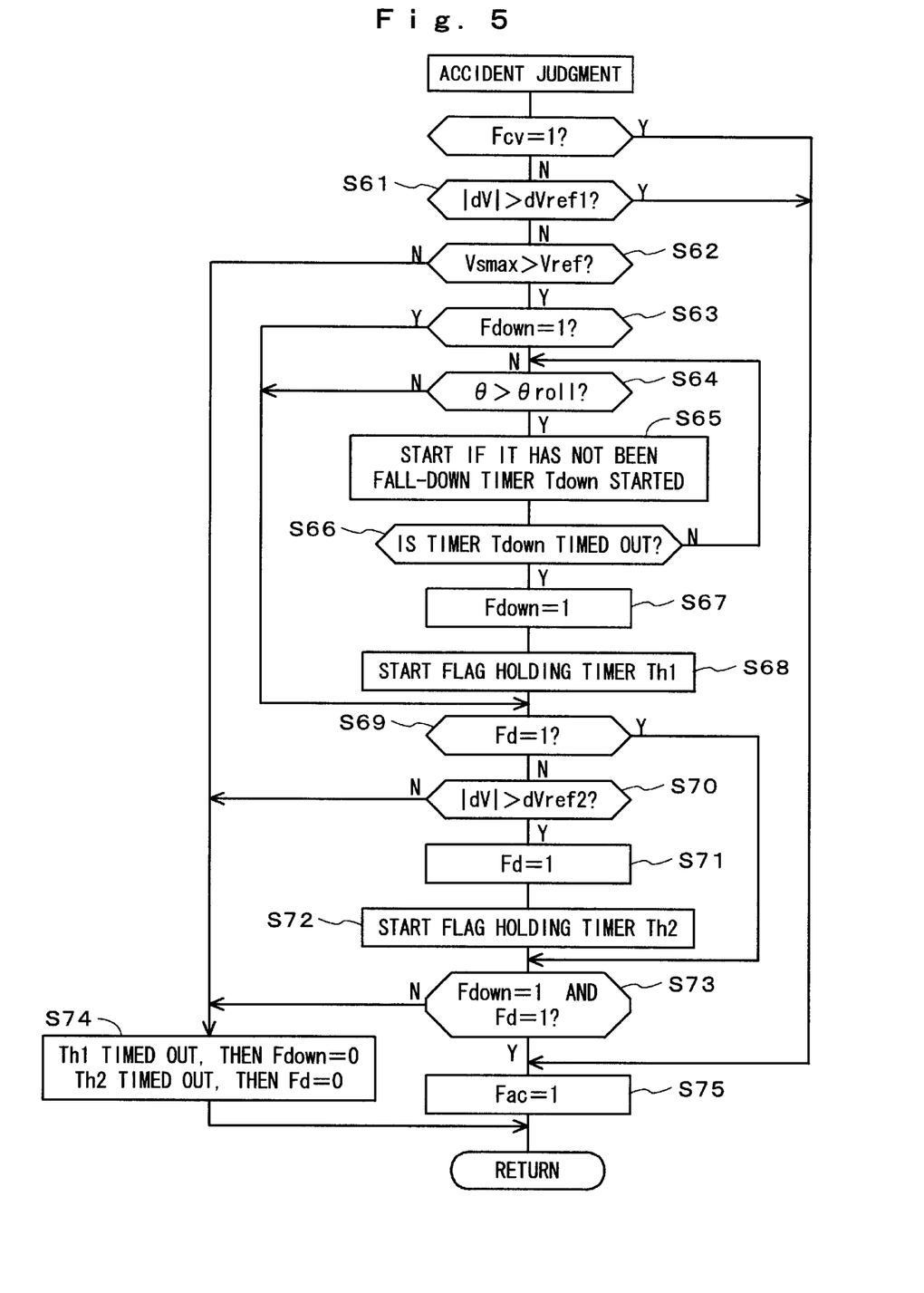
FIG. 5 is a flowchart showing a procedure of the accident judgment.
Figure 6:
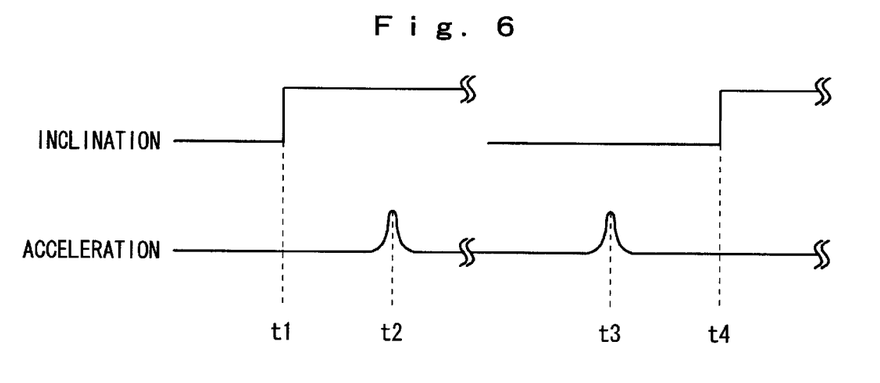
FIG. 6 is a diagram schematically showing a theory of the accident judgment.

FIG. 5 is a flowchart showing the action of accident judgment which is mainly the action of the accident judgment unit 340. FIG. 6 schematically illustrates the judgement process.

It commonly happens that a two-wheel vehicle falls down due to not only traffic accident but also misbalance even when the vehicle is not driven. In the latter case, the driver may hardly suffer from serious injury. It is hence desired for a system of judging the accident from data output of the inclination sensor to classify the event of fall down into two types caused by the traffic accident and by any other reason.

This embodiment employs the acceleration calculated from the vehicle speed V as a parameter for the accident judgment. More specifically, when the acceleration reaches an excessive rate and the fall down is detected, it is then judged that the traffic accident occurs.

It may not always be common for a two-wheel vehicle that a change in the acceleration and the fall down occur at the same time. As shown in FIG. 6, the vehicle may be fallen down (at t1), slid over the road surface, and then crushed (at t2). In this case, the acceleration is not largely changed at the timing of detection of the fall down. On the contrary, if the vehicle crashes (at t3) and then falls down (at t4), a change in the acceleration is faded out at the timing of detection of the fall down. In this embodiment, the accident judgment is modified to give a correct judgment when the change in the acceleration and the fall down are detected at an interval of time.

At Step S60 shown in FIG. 5, the accident break flag Fcv (FIG. 4) is examined. When the flag Fcv is set up, it is then judged that the accident occurs and the procedure jumps to Step S75. When the flag Fcv is in its reset state, the procedure goes to Step s61.

It is compared at Step S61 between the absolute of the acceleration dV at the current and an accident judgment reference acceleration dVref1 which is set to a larger rate (about 1.0 G) than the maximum (about 0.8 G) deceleration generated during the braking action. Accordingly, when the current acceleration dV exceeds the reference acceleration dVref1, it is judged that the accident occurs regardless of the fall down and the procedure jumps to Step S75. When the acceleration dv is not higher than the reference acceleration dvref1, the procedure moves to Step S62.

It is compared at Step S62 between the maximum speed Vsmax for e.g. the past five seconds and a not-informing reference speed Vref. When the maximum speed Vsmax exceeds the not-informing reference speed Vref, the procedure advances to Step S63. The not-informing reference speed Vref is an upper limit of a range of the speed where the driver is assumed not to suffer from serious injury when the vehicle crashes or falls down. In this embodiment, the not-informing reference speed Vref is set to 10 km/h. As the range of the speeds where the driver rarely suffers from serious injury when the vehicle crashes or falls down is varied depending on the size, the weight, and the shape of the vehicle, the not-informing reference speed Vref may be a rate dedicated to one particular type of the vehicle.

At Step S63, a fall-down flag Fdown is examined. The fall-down flag Fdown is turned on when the fall down continues throughout a specific length of time as will be described later in more detail. The fall-down flag Fdown is normally turned off. Then, the procedure goes to S64. It is then compared at Step S64 between the current inclination angle θ measured by the inclination sensor 2 and a fall-down judgment reference angle θroll. When the current inclination angle θ is not higher than the fall-down judgment reference angle θroll, the procedure goes to Step S64. On the contrary, if the current inclination angle θ exceed the fall-down judgment reference angle θroll, it is judged that the vehicle is fell down and the procedure goes to Step S65.

At Step S65, when the fall-down timer Tdown is not started, it is started. It is then examined at Step S66 whether or not the fall-down timer Tdown is timed out. When the current inclination angle θ returns back to below the fall-down judgment reference angle θroll before the fall-down timer Tdown is timed out, it is judged that the fall-down is caused by any other event than the traffic accident and the procedure jumps to Step S69.

When the fall-down timer Tdown is timed out before the current inclination angle θ returns back to below the fall-down judgment reference angle θroll, the procedure goes to Step S67 for setting the fall-down flag Fdown on. At Step S68, a flag holding timer Th1 is started for maintaining the fall-down flag Fdown in its set-up state throughout a specific length of time. The specific length of time Δt1 is calculated from a series of experiments as being equal to a difference (t2−t1) shown in FIG. 6.

At Step S69, an acceleration excess flag Fd is examined which is set up when the negative acceleration becomes excessively large as will be described later. The acceleration excess flag Fd is normally in its reset state and the procedure goes to Step S70. It is compared at Step S70 between the absolute of the current acceleration dV and an accident judgment reference acceleration dVref2. The accident judgment reference acceleration dvref2 is set to a lower limit (0.3 to 0.4 G) of a range of the acceleration which may be encountered when the vehicle crashes or falls down. As a result, when the current acceleration dV is not higher than the accident judgment reference acceleration dVref2, the procedure is terminated.

When it is judged that the current acceleration dV is higher than the accident judgment reference acceleration dVref2, the acceleration excess flag Fd is set up at Step S71. This is followed by Step S72 where a flag holding timer Th2 is started for maintaining the acceleration excess flag Fd in its set-up state throughout a predetermined length of time Δt2. The length of time Δt2 is calculated from a series of experiments as is equal to a difference (t4−t3) shown in FIG. 6.

It is then examined at Step s73 whether or not the fall-down timer Tdown and the acceleration excess flag Fd are in their set-up state. When so, the procedure goes to Step S75 for setting an accident flag Fac on.

When at least either the fall-down timer Tdown or the acceleration excess flag Fd is not in its set-up state, the procedure goes to Step S74 where the two flag holding timers Th1 and Th2 are examined. When the timer is timed out, its corresponding fall-down flag Fdown or acceleration excess flag Fd is reset to zero.

As described above, the embodiment permits the vehicle to be judged that it met with an accident when the inclination angle remains higher than the reference level throughout a period of time longer than a predetermined length. Accordingly, if the vehicle in its not-running mode falls down, it can be stood back by its driver and judged that it met with no traffic accident, thus eliminating an unnecessary action of informing.

Returning back to FIG. 2, Step S7 follows where the accident flag Fac is examined. When the accident flag Fac is not set up, the procedure goes back to Step S2. When the accident flag Fac is set up, the procedure moves to Step S8 for carrying out a reset stand-by process.

Figure 7:
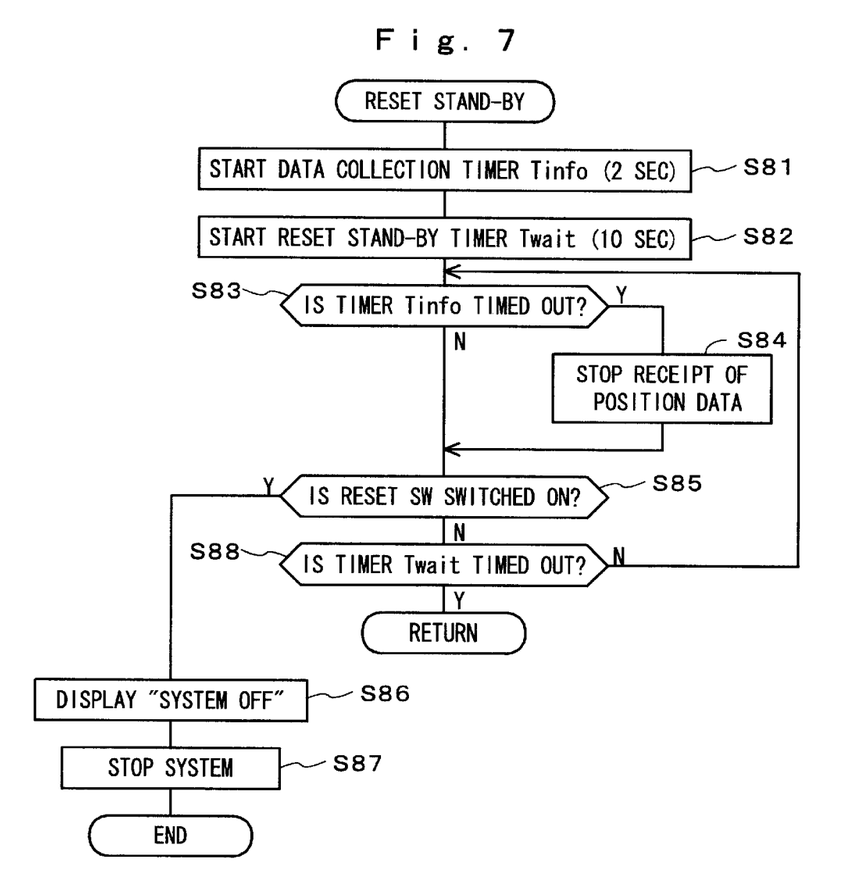
FIG. 7 is a flowchart showing a procedure of a reset stand-by action.

FIG. 7 is a flowchart showing the reset stand-by process. In this embodiment, when the accident judgment is made (at Fac=1) and the accident is too insignificant to be informed, its information can be canceled by the driver for switching on a cancel switch within a predetermined period of time.

At Step S81, a data collection timer Tinfo (set to two seconds in this embodiment) is started. At Step S82, a reset stand-by timer Twait (set to ten seconds in this embodiment) is started. It is then examined at Step S83 whether the data collection timer Tinfo is timed out or not. When the timer Tinfo is timed out, the procedure goes to Step S84 where the position data collecting action of the accident data memory 71 in the accident informing module 7 is stopped.

It is then examined at Step S85 whether the reset switch 5 is closed or not. When the reset switch is closed, the procedure moves to Step S86 for displaying a message "System OFF" on the screen of the display 6. At Step S87, the action of the automatic accident informing system is terminated.

When the reset switch 5 is not closed, it is examined at Step S88 whether the reset stand-by timer Twait is timed out or not. The steps from S83 to S88 are repeated until the timer Twait is timed out. When it is judged that the timer Twait is timed out, this subroutine is terminated and the procedure returns back to Step S9 shown in FIG. 2.

At Step S9, the parties to be informed and the position data saved in the accident data memory 71 are transferred to the transmitter 72 in the accident informing module 7. At Step S10, a group of the information is transmitted in a radio communications protocol such as PHS to the parties to be informed.

It is understood that the present invention is not limited to the embodiment where the position data of the vehicle to be informed when the accident occurs is generated and supplied by the GPS unit 32. In case that the communications unit 72 has a PHS function, it may produce and supply a position data based on the positioning operation of the PHS function.

Also, according to the embodiment, the accident judgment is made when the negative acceleration is detected and the vehicle is inclined excessively. If the vehicle is hit at its back by any other vehicle, the positive acceleration is created. Accordingly, the accident judgment may be made when the positive acceleration is detected and the inclination of the vehicle is large.

INDUSTRIAL APPLICABILITY

The present invention provides the following advantages.

(1) As the crash or fall-down of a two-wheel vehicle is detected from a signal output of the inclination sensor, the accident judgment can be more accurate and the overall arrangement can be simpler than that with a signal output of the acceleration sensor. Also, most two-wheel vehicles are equipped with the inclination sensor and will thus require no extra sensors for the accident judgment.

(2) The vehicle is judged to have a serious accident only when its inclination angle remains higher than a predetermined fall-down degree throughout a specific length of time. If the vehicle is fell down in its not-running mode and stood back quickly by the driver, it is not judged to have a serious accident, hence eliminating an unnecessary informing action.

(3) The fall-down flag Fdown and the acceleration excess flag Fd are maintained throughout the specific length of time and while the two flags are set up, the accident judgment is made. This allows the accident judgment to stay accurate when the change in the acceleration and the fall down are detected at an interval of time at the accident.

(4) The cancel switch is provided for canceling the automatic action of informing of the accident and when the cancel switch is turned on within a predetermined period of time after the accident, the informing action can be canceled. Accordingly, if the accident is too minor to be informed, its information can be canceled by the driver's will.

(5) The accident judgment is made when break in the particular signal lines has been detected. This permits the automatic action of informing the accident to be certainly executed even if the signal line to a primary sensor needed for the accident judgment is broken by the accident.

(6) The accident judgment is made from the break in the signal lines only when it is determined by a change in the acceleration after the accident that the running mode of the vehicle is not normal. Accordingly, if the break in the signal lines results from a minor error such as a misconduct during the maintenance action, the automatic action of informing the accident will not be performed.

What is claimed is:

1. An automatic accident informing apparatus for a two-wheel vehicle having an accident detecting means for detecting an accident of the vehicle and an accident informing means for informing an external party(s) of the accident, wherein the accident detecting means comprises:

an inclination sensor for measuring the inclination angle of the vehicle;

a vehicle speed history saving means for saving the history of speeds of the vehicle;

an acceleration calculating means for calculating the acceleration of the vehicle from a change in the vehicle speed saved in the vehicle speed history saving means; and an accident judging means for judging that the vehicle met with the accident when the inclination angle of the vehicle measured by the inclination sensor remains higher than a predetermined degree throughout a specific length of time about a time while the acceleration of the vehicle is greater than a predetermined level.

2. An automatic accident informing apparatus for a two-wheel vehicle having an accident detecting means for detecting an accident of the vehicle and an accident informing means for informing an external party(s) of the accident, comprising:

a vehicle speed history saving means for saving the history of speeds of the vehicle;

an acceleration calculating means for calculating the acceleration of the vehicle from a change in the vehicle speed saved in the vehicle speed history saving means; and a line break detecting means for detecting the break in particular circuitry lines, wherein
the accident detecting means judges that the vehicle met with the accident when the line break detecting means detects break in the circuitry lines about a time while the acceleration of the vehicle is greater than a predetermined level.

3. An automatic accident informing apparatus for a two-wheel vehicle according to claims 1 or 2, further comprising:

a cancel switch for canceling at least either the action of detecting the accident of the accident detecting means or the action of informing of the accident of the accident informing means, wherein the action of the accident detecting means or the accident informing means can be canceled only within a particular period of time after the occurrence of the accident but not when the particular period of time has passed.

* * * * *